United States Patent Office 3,283,526
Patented Nov. 8, 1966

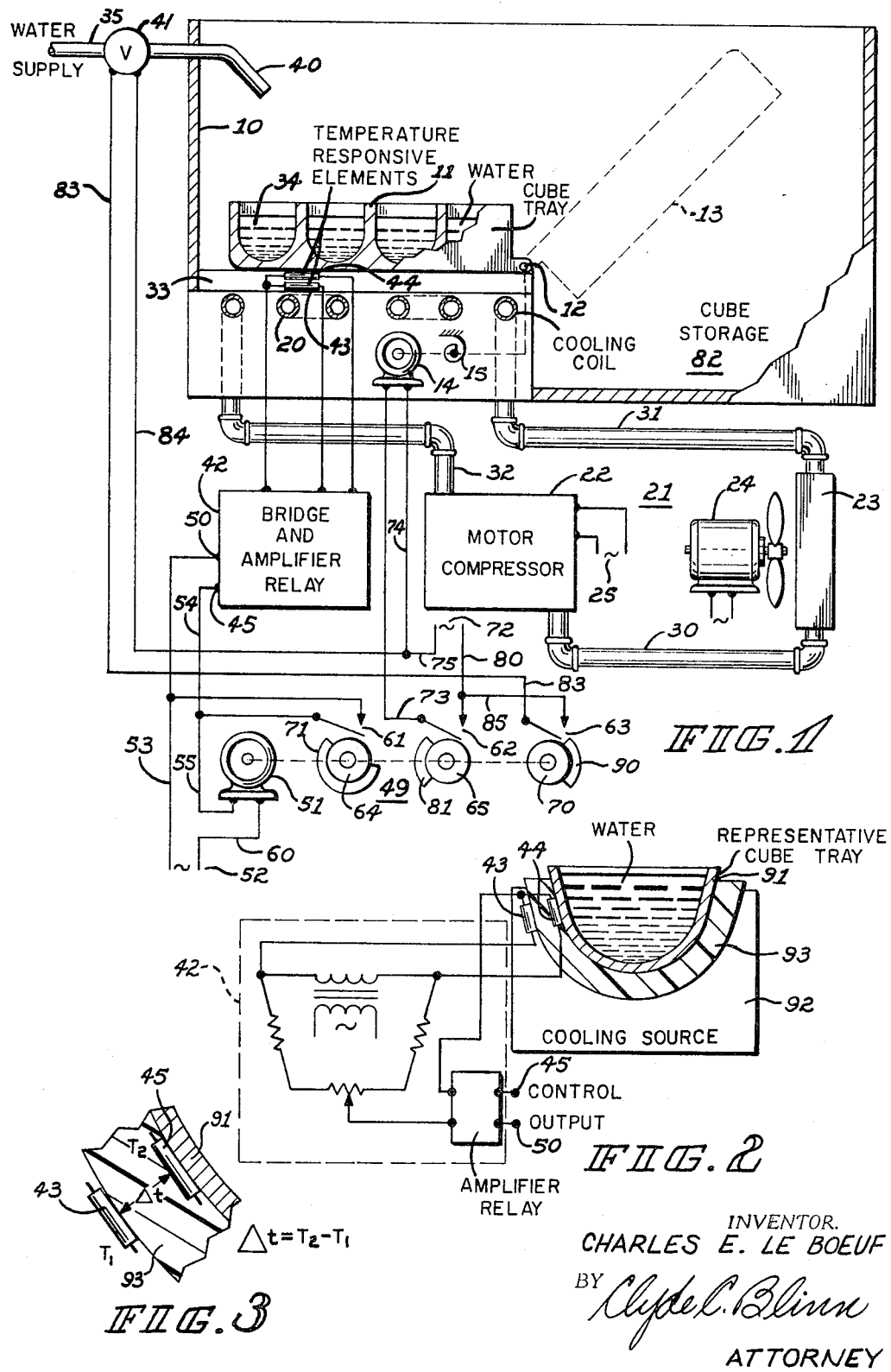

3,283,526
ICE MAKER CONTROL APPARATUS
Charles E. Le Boeuf, Dayton, Ohio, assignor to Honeywell, Inc., Minneapolis, Minn., a corporation of Delaware
Filed Oct. 20, 1964, Ser. No. 405,105
5 Claims. (Cl. 62—135)

The present invention is concerned with an improved system of controlling the termination of a freezing operation for water; in particular, in a cube freezing apparatus, the differential temperature measured along the heat flow path between the container holding water to be frozen and the heat removing source is measured and when the differential temperature drops to some predetermined low value, the water is frozen and another cycle of operation can be initiated.

In apparatus in which water is frozen, such as in an ice cube making machine, the time of operation of the cooling process has been controlled in various ways. In the prior art methods of accomplishing the control, the length of time of operation has either been too long or too short, and in order to eliminate the possibility of not completely freezing the water, the tendency is to maintain a longer freezing cycle than is necessary. For example, when a time cycle is used in which the freezing operation is maintained for a given time period, the time period is usually slightly longer than needed to eliminate any possibility that under usual conditions sufficient freezing of the water would not be accomplished.

In the present invention, the differential temperature along the heat flow path between a heat exchanger and the water compartment is measured and when the differential temperature which is indicative of the rate of heat flow reaches some predetermined value, the freezing operation is completed and another cycle can be started.

An object of the present invention is to provide an improved ice freezing control system wherein the freezing operation is terminated when the rate of flow of heat reaches some predetermined low value.

Another object of the present invention is to provide in a heat transfer operation a pair of temperature responsive means for measuring the differential temperature along the heat flow path to terminate the operation when the rate of heat flow reaches some predetermined value.

Another object of the present invention is to provide a control system for an ice cube machine wherein a first temperature sensor is placed adjacent the cube container and a second is placed adjacent the heat removing apparatus so a differential temperature signal is available which is responsive to the rate of heat flow from the water to terminate the operation when the rate of heat flow reaches a predetermined value.

These and other objects will become apparent upon a study of the following specification and claims of which;

FIGURE 1 is a schematic view of a typical ice cube machine using a refrigeration apparatus for cooling the water in a container and making use of the differential temperature to recycle the apparatus when the water is frozen;

FIGURE 2 is another embodiment of the present invention showing the application of the differential temperature measuring apparatus to a representative cube tray; and FIGURE 3 is a schematic showing of the differential temperature measurement of the two temperature sensors.

Referring to FIGURE 1, a typical ice manufacturing machine for making ice cubes is shown schematically. While the present invention is applicable to an ice cube machine of this type, the particular machine shown is only for explanation purposes as other types of machines which make use of a cooling coil for removing heat from water to manufacture ice are available and can be controlled by the present invention. A freezing compartment 10 contains a container or cube tray 11 which is pivotally supported on a shaft 12. The cube tray is moved from the position shown to a cube releasing or dumping position 13 shown in dotted lines by a motor 14 connected to shaft 12 and is returned to the original position by a spring 15 attached to shaft 12. When motor 14 is energized, tray 11 is moved clockwise until the tray hits a mechanical stop (not shown) and when the motor 14 is de-energized, spring 15 moves the tray back to the original position.

A cooling evaporator coil or heat exchanger 20 positioned below the cube tray is connected to a conventional refrigeration system as shown in the Newton Patent 2,214,700 having a motor compressor 22 and a condenser coil 23 which is cooled by a fan driven by motor 24. Motor compressor 22 is connected to a source of power 25 to be constantly energized to supply compressed refrigerant by a conduit 30 to condenser 23. The liquid refrigerant then passes by conduit 31 to the evaporator coil 20 to evaporate and return to the compressor through a conduit 32. Heat exchanger 20 has a conductive heat removing surface 33 to support tray 11 so the heat can be removed from water 34 in container 11 to freeze the water and make cubes. Surface 33 must have some thermal conducting resistance to provide some temperature gradient in the direction of heat flow. A water supply 35 is connected into a pipe 40 through valve 41 to fill container 11 whenever the valve 41 is energized.

A bridge and amplifier relay 42 of a conventional type shown in the Upton Patent 2,423,534 has a pair of temperature responsive elements or sensors 43 and 44 connected to the input circuit. The resistance of elements 43 and 44 are connected in adjacent legs of the bridge circuit so the difference in the resistance of the elements provides an input to the amplifier to control a relay for switching the output circuit connected between terminals 45 and 50.

Timing mechanism 49 has a constant speed timer motor 51 which is connected to a source of power 52 by the output circuit of amplifier relay 44 throuhg a circuit traced as follows: from the source of power 52, a conductor 53, a terminal 50, a terminal 45, a conductor 54, a conductor 55, motor 51, and through a conductor 60 back to the other side of the source of power. Motor 51 has a slow speed output connected to control a plurality of switches 61, 62 and 63 by rotating cams 64, 65 and 70 respectively. Switch 61 is connected in parallel with the output circuit of the bridge amplifier relay by connecting the switch between conductors 53 and 55. Switch 61 provides a holding circuit; so that, once the timer motor 51 is energized by the bridge amplifier relay, a high portion 71 on cam 64 closes the switch to maintain the switch closed during one complete cycle of the timing mechanism. Once timing mechanism 49 is started by starting motor 51, the timing mechanism will continue through one complete cycle. Switch 62 is connected to control the energization of motor 14 from a source of power 72 by a circuit traced as follows: from switch 62, a conductor 73, motor 14, a conductor 74, a conductor 75, power source 72, a conductor 80, and back to switch 62. When the high portion 81 on cam 65 closes switch 62, the motor 14 is energized to move tray 11 to the dumping position as shown in 13 to release the frozen cubes from the tray into the cube storage compartment 82. Switch 63 controls the operation of the water supply valve 41 through a circuit traced as follows: from switch 63, a conductor 83, valve 41, a conductor 84, a conductor 75, source of power 72, a conductor 80, a conductor 85, and back to the other side of the switch 63. When the high portion 90 of cam 70, which is effective somewhat later in time than the high portion 81, closes switch 63, water is ejected from pipe 40 into the cube tray. The sequence of the switches 63 and 62 obviously must be so that the cube tray 11 is returned to the position as shown before water valve 41 is opened.

Another embodiment of the present invention is shown in FIGURE 2 where a similar bridge amplifier relay provides a control output at terminals 45 and 50 depending upon the differential temperature as sensed by sensors 43 and 44 connected to the input circuit. Sensors 43 and 44 are positioned to measure the differential temperature and thus the rate of heat flow from a representative cube tray 91 which is cooled by a conventional cooling source 92. The heat transfer medium 93 between tray 91 and the cooling source 92 provides a thermal temperature drop which is measured by sensors 43 and 44. The output of amplifier relay 42 available the terminals 45 and 50 can be connected to control the termination of the freezing cycle accomplished by the cooling source 92 in a conventional manner.

FIGURE 3 is a schematic showing of the temperature sensors 43 and 44 mounted on each side of the installation medium 93 to provide the $\Delta t$ or differential temperature resulting from the difference between $T_2$ and $T_1$. The $\Delta t$ is indicative of the rate of heat flow from the cube tray or water to the cooling source and when this rate of heat flow drops to some predetermined value as measured by the $\Delta t$, the water in the cube tray is frozen.

In the control of such apparatus, the rate of heat flow can be measured by one temperature sensor if the capacity of the heat exchanger remains constant. With a coil 20 having a fixed temperature only sensor 44 would be necessary and when the temperature of sensor 44 reached a predetermined value, the rate of heat flow is below a predetermined value to indicate that the water was frozen.

OPERATION

As shown in FIGURE 1, the cube making machine has tray 11 filled with water and upon energization of motor compressor 22 by a power source 25, the heat exchanger 20 begins to cool water 34 in the tray. Initially the temperature of sensor 43 would drop somewhat and a high $\Delta t$ or differential temperature would exist between sensors 43 and 44 as sensor 44 is thermally closer to tray 11. As long as the water is not frozen, the temperature of the water is quite high to keep sensor 44 at a high temperature. With this wide spread in temperature between sensors 43 and 44, $\Delta t$ or the rate of heat flow between cube tray 11 and heat exchanger 20 is high. When the water 34 in tray 11 becomes frozen, the rate of heat flow through the thermal conducting medium 33 drops off considerably and the temperature of sensor 44 drops. As the temperature of sensors 43 and 44 becomes relatively close, the $\Delta t$ or differential temperature is small and the bridge amplifier relay 42 closes the circuit between the output terminals 45 and 50 to initiate the operation of timing mechanism 49. Motor 51 begins to move in a clockwise direction to move cam 64 to close switch 61. Switch 61 provides a holding circuit to maintain timing mechanism 49 in operation even though bridge amplifier relay 42 returns to the initial position of an open circuit between terminals 45 and 50. Such would be the case as soon as tray 11 is lifted off of support 33 to allow sensor 44 to increase in temperature. Switch 62 closes to energize motor 14 to move tray 11 to the position as shown in 13 to dump the ice cubes. When the cube tray 11 was turned to the initial position as shown in FIGURE 1, switch 63 closes and water again fills the tray as long as the high portion 90 maintains switch 63 closed and valve 41 energized.

In the second embodiment of the present invention as shown in FIGURE 2, the sensors 43 and 44 are placed adjacent a representative cube tray in the ice machine. As long as the control of the freezing of the representative cube is accomplished to provide a long enough period to freeze the water in the remaining trays of the machine, the operation of the machine will be satisfied. Sensors 43 and 44 are placed across thermal medium 93 to measure the rate of heat flow from cube tray 91 to the cooling source 92. The differential temperature between the sensors 43 and 44 as shown in FIGURE 3 is a measure of the heat flow between the medium being cooled and the cooling source as represented in both FIGURES 1 and 2. Sensors 43 and 44 are placed in line with the paths of heat transfer so the differential temperature is reduced when the rate of heat flow drops to some predetermined value.

While the invention is shown in a particular manner as applied to the manufacture of cubes in an ice cube machine, the intent is to limit the scope of the invention only by the scope of the appended claims in which I claim:

1. In a control system for controlling ice cube making apparatus having a refrigeration apparatus with a heat exchanger for removing heat from a cube forming tray, bridge circuit means having a first and second adjacent legs and having an output and an input circuit, circuit means adapted to connect said output circuit to said refrigeration apparatus, first and second temperature responsive impedance means, electrical means connecting said first and second means to said input circuit to be in said adjacent legs in opposition, said first and second means being adapted to be mounted between said tray and said heat exchanger to respond to a differential temperature indicative of heat flow between said tray and the heat exchanger whereby upon a decrease in the temperature differential to a predetermined value said output terminates the operation of the refrigeration apparatus.

2. In a control system for controlling ice making apparatus having a refrigeration apparatus with a heat exchanger for removing heat from a water holding container, circuit means having an output and an input circuit, circuit means adapted to connect said output circuit to control said refrigeration apparatus, first and second temperature responsive means, electrical means connecting said first and second means to said input circuit to be in opposition, said first and second means being adapted to be mounted adjacent the container along a line of heat flow between said container and the heat exchanger to respond to a differential temperature indicative of heat flow between said tray and the heat exchanger whereby upon water in the container freezing the heat flow will decrease and a decrease in the temperature differential to a predetermined value terminates the operation of the refrigeration apparatus.

3. In control apparatus for termination of an operation cycle of a water freezing apparatus when the rate of heat flow from the water to a heat removing apparatus reaches a predetermined value, first temperature sensing means, means mounting said first sensing means in close thermal relation to the water, second temperature sensing means, means mounting said second sensing means in close thermal relation to the heat removing apparatus, and circuit means connecting said first and second means to provide an output signal indicative the rate of heat flow between the water and said apparatus, and means connecting said output signal to control the termination operation of the cycle.

4. In control apparatus for controlling the length of time heat is removed from water for forming ice, a container for holding water to be frozen, first temperature responsive means, means mounting said first means in close thermal relation to said container, heat removal means mounted in thermal relation to said container, second temperature responsive means, means mounting said second sensing means in close thermal relation to said heat removal means, and circuit means connecting said first and second means to provide a differential temperature output signal indicative the rate of heat flow between the water and said heat removal means and circuit means including said last mentioned circuit means for terminating said heat removing operation whereby upon the water being frozen when the rate of heat removed from the water reaches a predetermined value, the ice forming operation is terminated.

5. In control apparatus for terminating a water freezing operation when a rate of flow of heat from the water to a heat removing apparatus drops to a predetermined low level, first temperature sensing means, said first means being mounted in close thermal proximity to a container holding the water, second temperature sensing means, said second means being mounted in close proximity to the heat removing apparatus, control means having an output circuit, connection means connecting said first and second sensing means to said control means, circuit means adapted to connect said output circuit to control the termination of heat removal whereby operation thereof is continued until the temperature difference measured by said first and second sensing means is a predetermined value.

References Cited by the Examiner

UNITED STATES PATENTS

| | | | |
|---|---|---|---|
| 2,556,081 | 6/1951 | Hartman | 236—15 |
| 2,669,848 | 2/1954 | Fujii | 62—140 X |
| 2,828,450 | 3/1958 | Pinckaers. | |
| 3,123,980 | 3/1964 | Steimel | 62—208 X |
| 3,217,510 | 11/1965 | Kniffin et al. | 62—135 X |

ROBERT A. O'LEARY, *Primary Examiner.*

W. E. WAYNER, *Assistant Examiner.*